United States Patent [19]

Kliever

[11] Patent Number: 4,574,197
[45] Date of Patent: Mar. 4, 1986

[54] DUAL FIELD OF VIEW SENSOR

[75] Inventor: Waldo W. Kliever, Playa del Rey, Calif.

[73] Assignee: Hughes Aircraft Company, El Segundo, Calif.

[21] Appl. No.: 478,438

[22] Filed: Mar. 24, 1983

[51] Int. Cl.$^4$ .................... H01J 31/50; H04N 3/08
[52] U.S. Cl. ................... 250/334; 250/347; 350/6.7; 358/206
[58] Field of Search ........... 250/334, 347, 332; 350/6.8, 274, 6.7; 358/206, 113, 88, 109

[56] References Cited

U.S. PATENT DOCUMENTS

| | | | |
|---|---|---|---|
| 3,408,492 | 10/1968 | Astheimer | 250/347 |
| 3,597,536 | 8/1971 | Fowler | 358/206 |
| 3,646,568 | 2/1972 | Woywood | 358/206 |
| 3,804,976 | 4/1974 | Gard | 250/334 |
| 3,805,073 | 4/1974 | Jayachandra et al. | 250/347 |
| 4,432,596 | 2/1984 | Campbell et al. | 350/1.3 |
| 4,458,982 | 7/1984 | Blain et al. | 350/274 |

FOREIGN PATENT DOCUMENTS

| | | | |
|---|---|---|---|
| 14399943 | 6/1976 | United Kingdom | 358/113 |
| 2101352 | 1/1983 | United Kingdom | 350/6.8 |

*Primary Examiner*—Alfred E. Smith
*Assistant Examiner*—Carolyn E. Fields

*Attorney, Agent, or Firm*—Lewis B. Sternfels; A. W. Karambelas

[57] ABSTRACT

A dual field of view sensor, particularly adapted for use as a forward-looking infrared night vision detector, includes a single detector (24) for receiving a light signal and developing an output electrical signal therefrom. A rotating polygon scanner (16) having a plurality of reflective facet (14) thereon receives light (12, 34) from two separate optical systems (10, 32) and directs the light onto the facets (14) of the scanner (16) at positions offset by one-half the facet angle such that the light beams alternately strike a facet and the juncture between two facets. The reflected light is then directed through a beam splitter 40 onto the detector in an alternating, interleaved sweeping motion. The beam splitter permits only one at a time of the light (12, 34) from entering the detector. In one embodiment, both optical systems include a steerable dual field of view telescope. In a second embodiment, a transparent display (60) such as an LCD panel, impresses a data image on one light beam (52) and the signals developed from that and another light beam are combined to drive a display. In a third embodiment, the two light beams represent the input to a stereoscopic viewing system, and the separate signals developed therefrom are used to drive a pair of small helmet-mounted displays for individual viewing by the wearer's left and right eyes to provide stereoscopic night vision viewing.

19 Claims, 3 Drawing Figures

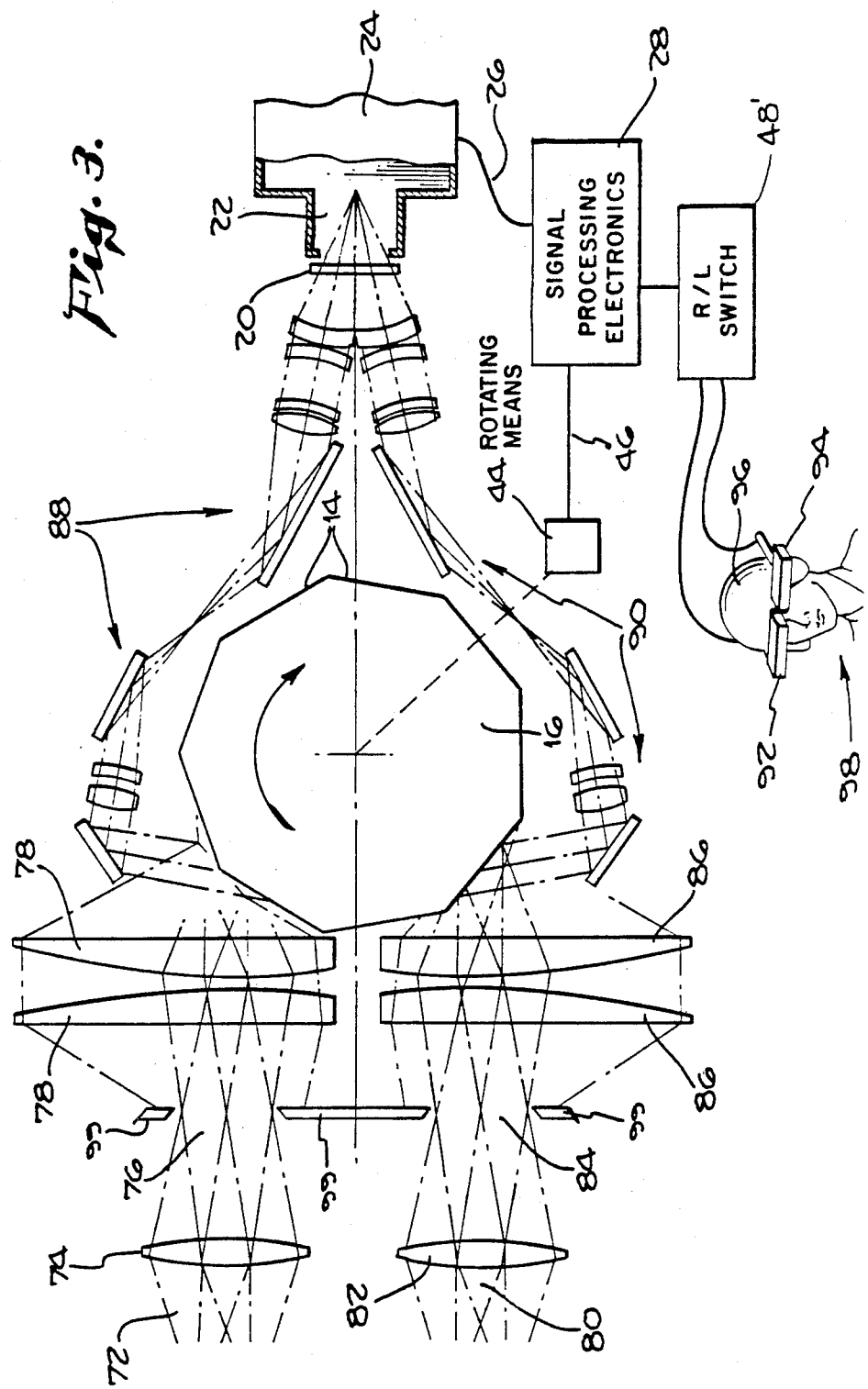

DUAL FIELD OF VIEW SENSOR

BACKGROUND OF THE INVENTION

The present invention relates to electro-optical display systems and, more particularly, to infrared systems and systems employing two light beams and associated electronics such as those which provide stereoscopic viewing.

Forward looking infrared scanning systems are known in the art. In such systems, an electro-optical detector converts incident "light" into an electrical signal which is then processed by a signal processor and used to drive an imager. A directionable telescope unit is employed to point the line of sight in a desired direction. The received light beam enters the telescope assembly wherein an optical system directs it onto a rotating polygon scanner having a reflective faceted surface thereon. The rotation of the scanner causes the beam to be swept across the sensitive detecting surface of a cryogenically cooled detector.

Such systems are both heavy and costly because of the above-described components. Unfortunately, they are also notoriously inefficient, since the polygon scanner is typically only about 50% efficient because the line of sight is broken up by the passing corners of the scanner between facets.

Accordingly, it is the object of the present invention to provide an optical scanning system for forward looking infrared systems and the like which is of high efficiency and which also affords additional capabilities such as stereoscopic and component sharing.

SUMMARY

The foregong objectives have been accomplished in a forward looking infrared optical scanning system or the like employing a scanner, a detector, a beam clipper or equivalent, and signal processor in which a first optical assembly is employed to direct light entering from a first line of sight against the reflective surface of a rotating polygon scanner so that it is sequentially reflected from the facets of the scanner across the detector in a sweeping scan pattern to produce a signal therefrom, by the improvement of the present invention comprising a second optical assembly disposed to direct light entering from a second line of sight against the reflective surface of the scanner at a point displaced one-half its facet angle whereby the detector and signal processor and any other mechanisms are time-shared as a result of light from the first and second lines of sight being interleavidly swept, one at a time, across the detector.

In one embodiment of the invention, a combined image on a single display is formed.

In a second embodiment, two displays are employed in addition to means for separating signals from the first and second lines of sight for displaying them on respective ones of the displays.

In yet another embodiment, the second optical assembly includes a directional telescope assembly for changing the line of sight of light entering therein to provide two independent lines of sight.

In the preferred embodiment, beam interrupter means are disposed in the paths of the first and second light beams adjacent the detector to provide better isolation.

DESCRIPTION OF THE DRAWINGS

FIG. 3 is a simplified drawing of the present invention in yet a third embodiment.

DESCRIPTION OF THE VARIOUS EMBODIMENTS

Figure 1:
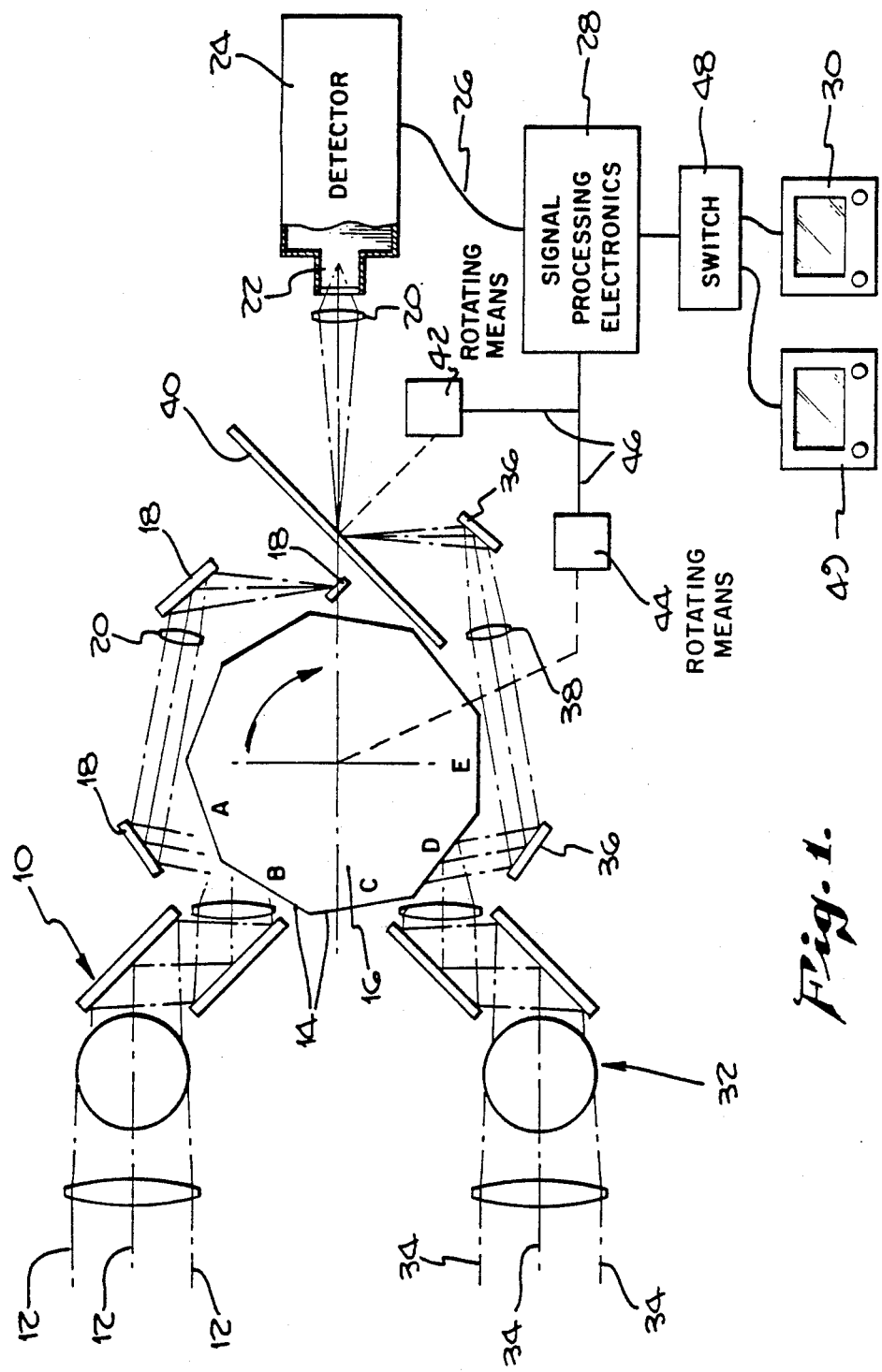
FIG. 1 is a simplified drawing of the present invention according to a first embodiment.

Turning first to FIG. 1, the present invention is shown in the preferred embodiment wherein two independent lines of sight produce separate images with shared components. The components comprising a forward looking infared system according to the prior art comprise a first telescopic optic assembly, generally indicated by indicium 10. Assembly 10 gathers and directs light 12 from a first line of sight onto the facets 14 of a polygon scanner 16 from which the light is reflected from mirrors 18, through lenses 20, and onto the sensitive surface 22 of cryogenically cooled detector 24 in a sweeping pattern. The electrical signal from detector 24 on line 26 is connected to signal processing electronics 28 which is used to drive a display such as that labelled 30. The techniques of the optics and electronics described hereinbefore are all well known to those skilled in the art and, therefore, to avoid redundancy, no further explanation thereof is included herein.

To accomplish the purposes of the present invention in this embodiment, a second telescopic optic assembly, generally indicates as 32, is provided and disposed to direct light 34 from a second line of sight onto the facets 14 of the polygon scanner 16 at a point displaced one-half the facet angel from the position of direct incidence of light 12 from telescopic optic assemby 10. That is, as shown in FIG. 1, the light 34 is directly incident on the facet 14 labelled "D" whereas the light 12 from the first telescopic optic assembly 10 is incident on the juncture point between the facets 14 labelled "A" and "B". If the polygon scanner 16 rotates one-half the facet angle, light 12 will then be directly incident on the facet 14 labelled "B" while light 34 will now be incident on the juncture between the adjacent facets 14 labelled "D" and "E". Light 34 as reflected from the facts 14 of polygon scanner 16 is directed by mirrors 36 and lens 38 against a rotating beam chopper 40. The beam chopper comprises a wheel with alternate open and reflective surfaces rotated by rotating means 42 in such a manner that light 12 and 34 is alternately directed through lens 20 onto the sensitive surface 22 in the above-described sweeping action. Significantly, the rotation of the beam chopper 40 is synchronized with the rotation of the polygon scanner 16 so that only light from a full facet is transmitted to the detector 24, thus avoiding signal overlap between the two beams 12, 34 at the detector 24. For example, in FIG. 1, facet B of the polygon scanner 16 does not fully face the light beam 12, and, therefore, the beam chopper 40 blocks the light from facet B at the instant ilustrated in FIG. 1. At the same instant, however, facet D of the polygon scanner 16 fully faces the light beam 34, and the beam chopper 40 permits the reflected light from facet D to be transmitted to the detector 24. The beams are alternately interleaved in their sweep across the surface 22 of detector 24.

The polygon scanner 16 is rotated by rotating means 44. Positional information from the two rotating means 42, 44 can be input to the signal processing electronics through lines 46 as necessary. An electronic switch 48 is interposed between the signal processing electronics 28 and the two displays 30 and 40. Using techniques well known to those skilled in the art, the signals produced from the light beams 12 and 34 are separated and switched to respective ones of the imagers 30, 49 such that two separate images are created corresponding to the views in the lines of sight of light 12 and light 34.

Figure 2:
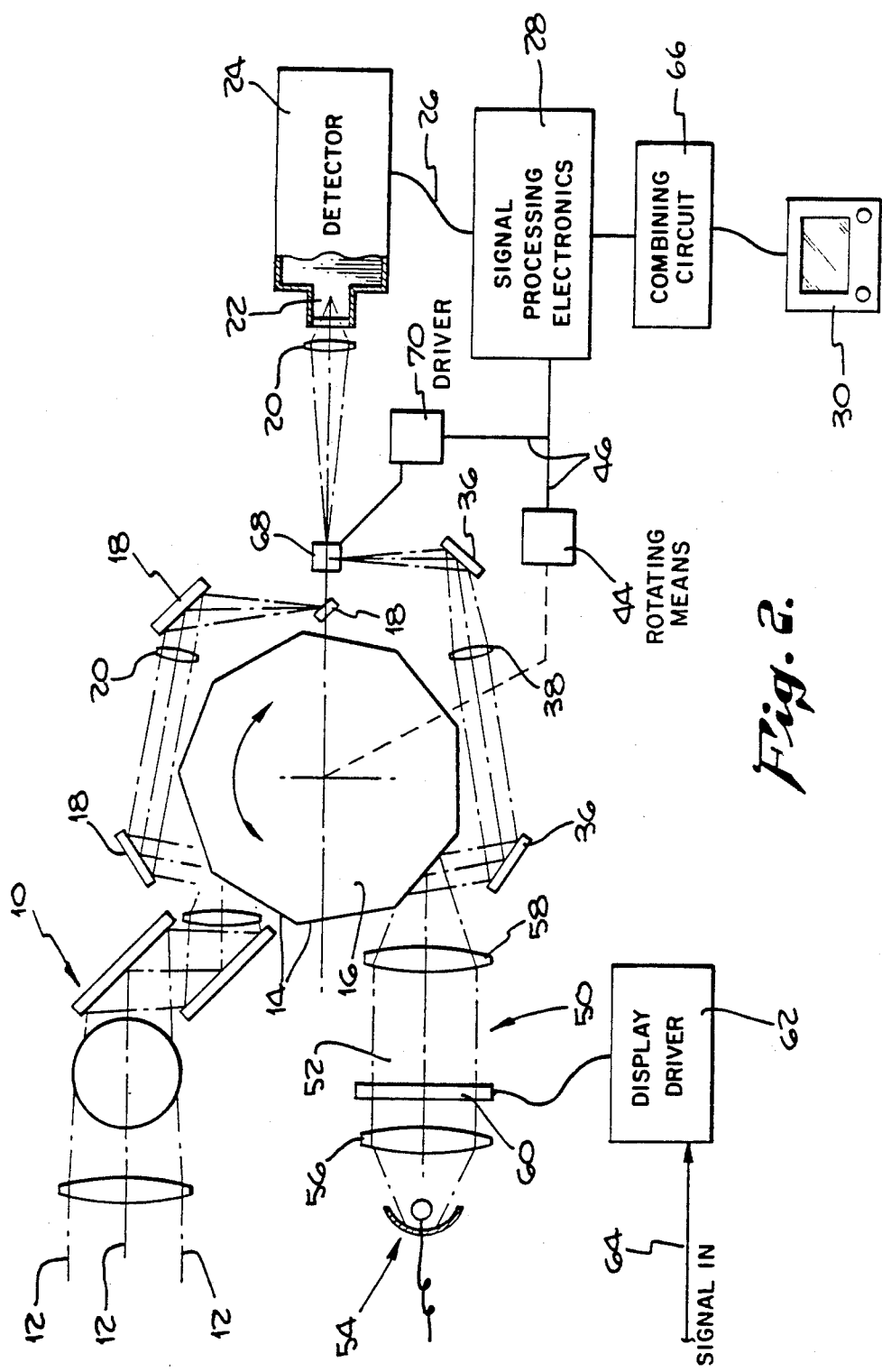
FIG. 2 is a simplified drawing of the present invention in a second embodiment.

Turning now to FIG. 2, a second embodiment of the present invenion is shown. In this embodiment, the second telescopic optic assembly 32 of FIG. 1 is replaced by a display generally indicated by indicium 50. A collimated beam of light 52 is created by light source 54 and lens 56. A second lens 58 is used to project the light 52 onto a facet 14 displaced at one-half the facet angle as in the previous embodiment. A generally transparent display panel 60, such as a liquid crystal panel or the like, capable of being driven by a driver 62 in response to an incoming signal on line 64, is disposed in the collimated light beam 52. As the display driver 62 is fed input signals on line 64, the display 60 impresses the image on the collimated light beam 52 whereupon it is reflcted into the detector 24 as in the previous embodiment. The switch 48 from the previous embodiment is replced by a combining circuit 66 (again according to techniques well known to those skilled in the art) the output of which is used to drive a single display 30. The result is a single image combining the image being observed through the telescopic assembly 10 with the image on the display 60 superimposed thereon. Such an arrangement is particularly useful for providing tank drivers and the like with both a forward view and range information impressed thereupon. Thus the necessity is eliminated for the driver to remove his field of view from the forward scene, which he is observing, in order to obtain range and target information. It should be noted that, as previously mentioned, in this embodiment, the beam splitter wheel 40 has been replaced by piezo-electric controlled crystal 68, which is controlled by driver 70 to perform the same function as that performed by the beam chopper 40 of FIG. 1.

The display 50 may comprise a thermal reference source, rather than the light source 54 and the display panel 60, for use in periodically calibrating the detector 24 and the processing electronics 28.

Turning now to FIG. 3, the present invention is shown in its simplest and most compact embodiment as employed in a night vision goggle/helmet assembly providing stereoscopic dual field of vision. Light 72, corresponding to the view to be associated with the right eye, passes through lens 74, aperture 76, and lenses 78, by which it is transmitted to the facets 14 of the polygon scanner 16 at a first location. Light 80, corresponding to the view for the left eye, passes lens 82, aperture 84, and lenses 86. It is then focused onto the facets 14 of the polygon scanner 16 at a second location, again one-half a facet angle relative to the orientation of the first position. Light 78 as reflected from the facets 14, is directed by the optic system generally indicated as 88, through lens 20 onto the sensitive surface 22 of detector 24 in a scanning sweep as hereinbefore described. Light 80, as reflected from the polygon scanner 16, is directed by a second optic system 90, which is a virtual mirrored image of the optic system 88, through lens 20 onto the surface 22 of detector 24. As previously described, the one-half facet angle offset creates interleaved sweeping actions by the light 72 and 80. The outputs from the signal processing electronics 28 is passed through a right/left switch 48' (which is substantially identical to the switch 48 used in the embodiment of FIG. 1) and then used to drive respective ones of a pair of displays 92, 94 attached to helmet 96 worn by observer 98, such that each one of the imagers 92, 94 is disposed to be viewed by respective ones of the observer's left and right eyes.

With the absence of the beam splitter wheel 40 or piezo-electric controlled crystal 68, there can be some overlap of the two light beams 72, 80 at the detector 24. However, field stops 99, defining the apertures 76 and 84, are positioned as illustrated in FIG. 3 so that, when one of the optical systems 88, 90 views a scene through a respective one of the apertures 76, 84, the other views only the field stop 99 and, therefore, senses only a low uniform background radiation level, corresponding to zero signal. For this purpose, the field stop 99 comprises low infrared emissivity material maintained at a uniform temperature.

Although the invention has been described with reference to particular embodiments thereof, it should be realized that varius modifications may be made therein without departing from the spirit and scope of the invention.

Wherefore, having thus described my invention, I claim:

1. A dual path optical sensor system comprising:
   (a) detector means having an input and an output for receiving a light signal at said input and for converting the light signal into an electrical signal for transmission thereof from said output;
   (b) a rotatable polygon scanner having a plurality of substantially equal reflective facets thereon;
   (c) means for rotating said scanner at a constant speed;
   (d) first optical means for receiving a first light beam and for directing the first light beam on said facets;
   (e) second optical means for receiving the first light beam as it is reflected from said facets and for directing the first light beam onto said input of said detector means;
   (f) third optical means for receiving a second light beam and for directing the second light beam onto said facets, said first and third optical means being mutually positioned so that, when the first light beam is impinging directly on one of said facets, the second light beam is impinging on the mid-point between two adjacent other ones of said facets, and vice-versa;
   (g) fourth optical means for receiving the second light beam as it is reflected from said facets and for directing the second light beam onto said input of said detector means;
   (h) means for preventing simultaneous receipt of the first and second light beams on said detector means input; and
   (i) means connected to said output of said detector means for receiving and processing signals resulting from the first and second light beams.

2. The sensor system of claim 1 in which said preventing means comprises beam splitter means disposed in the paths of the first and second light beams for passing ones of the light beams that are being reflected from one of said facets and for blocking ones of the light beams that are impinging on the junction between two adjacent ones of said facets.

3. The sensor system of claim 1 wherein:

(a) said first and second optical means include independent controllable inlet means for selecting the direction of field of view for receiving an incoming light beam whereby two different fields of view can be selected simultaneously; and (b) said signal receiving and processing means includes a pair of displays for viewing and means for directing the signal resulting from the first light beam to drive one of said displays and the signal resulting from the second light beam to drive the other of said displays.

4. The sensor system of claim 1 additionally comprising display means disposed in the path of the second light beam for receiving an electrical sighal at an input thereof and for impressing an optical representation of the light signal onto the second light beam to include the information in the electrical signal in the display image created by said signal receiving and processing means.

5. In a forward-looking infrared optical scanning system employing a detector, a signal processor, a rotating polygon scanner having reflective facets on its periphery, and a first optical assembly in which light entering from a first line of sight is directed against the rotating polygon scanner so that it is reflected from the facets sequentially across the detector in a sweeping scan pattern to produce a signal therefrom, the improvement comprising:

a second optical assembly having means for directing light entering from a second line of sight at a rotational angle against the reflective surface of the scanner at an angle which is out of phase by a one-half facet angle of rotation from that reflecting the light entering from the first line of sight to interleavedly sweep the light across the detector and thereby to enable the detector and signal process to be time-shared.

6. The improvement of claim 5 additionally comprising means for producing a combined image on a single display from the signal output from the detector derived from the light from said first and second lines of sight.

7. The improvement of claim 5 additionally comprising:

(a) a pair of displays; and (b) means for processing the signal outputs from the detector derived from the light from the first and second lines of sight and for displaying them on respective ones of the displays.

8. The improvement of claim 7 wherein:

said first optical assembly and said second optical assemby respectively include directional telescope wide field of view and narrow field of view assemblies.

9. The improvement of claim 5 additionally comprising beam splitter means disposed in the paths of the light from the first and second lines of sight respectively for passing ones of the beams that are being reflected from one of said facets and for blocking ones of said light beams that are impinging on the junction between two adjacent ones of said facets.

10. A dual path optical sensor system comprising:

(a) an electro-optical sensor having an input surface for receiving impinging light and an output at which an electrical signal is produced as a function of light impinging on said input surface;

(b) a first optical system disposed to receive light from a first line of sight and to direct it along a first path;

(c) a second optical system disposed to receive light from a second line of sight and direct it along a second path;

(d) a rotating polygon scanner disposed to intercept and reflect the light in said first and second paths at a one-half facet angle offset between said first and second paths and to interleavedly sweep the light from said first and second paths towards said input surface; and (e) means positioned between said sensor and said scanner for permitting only seriatim reception of the light from said first and second optical systems.

11. The optical sensor system of claim 10 additionally comprising means for producing a combined image from the signal output from said sensor as a result of the light from said first and second lines of sight on a single imager.

12. The optical sensor system of claim 10 additionally comprising:

(a) a pair of displays; and (b) means for processing the signal outputs from said sensor as a result of the light from said first and second lines of sight and for displaying them on respective ones of the displays.

13. The optical sensor system of claim 10 wherein:

said first optical system and said second optical system both include directional telescope assemblies having different fields of view.

14. The optical system of claim 10 in which said means positioned between said sensor and said scanner comprises a beam chopper which passes light in a first of said beams that is being reflected from one of said facets and which blocks light in a second of said beams that is impinging on the junction between two adjacent ones of said facets.

15. A dual path forward-looking infrared sensor system comprising:

(a) a cryogenically-cooled electro-optical sensor having an input for receiving impinging light and an output at which an electrical signal is produced as a function of the impinging light;

(b) a first optical system disposed to receive light from a first line of sight, direct it along a first path, and focus it on said input;

(c) a second optical system disposed to receive light from a second line of sight, direct it along a second path, and focus it on said input;

(d) a rotating polygon scanner disposed to intercept and reflect the light in said first and second paths and having means defining a one-half facet angle offset between said first and second paths for sweeping the light from said first and second paths alternatingly across said input; and (e) means positioned between said sensor input and said scanner for enabling only one at a time of the alternatingly swept light to be received by said sensor input.

16. The dual path forward-looking infrared sensor system of claim 15 additionally comprising means coupled to said sensor for producing a combined image from the sensor signal output.

17. The dual path forward-looking infrared sensor system of claim 15 additionally comprising:

(a) a pair of displays; and (b) means coupled to said sensor for processing the signals output therefrom and for displaying the processed signals on respective ones of the displays.

18. The dual path forward-looking infrared sensor system of claim 15 wherein said first and second optical systems respectively have means which include directional telescope assemblies for changing the lines of sight of light entering said respective assemblies.

19. The dual path forward-looking infrared system of claim 15 in which said scanner includes a plurality of facets having junctions therebetween and said means positioned between said sensor input and said scanner comprises beam chopper means respectively passing the light reflected from one of said facets and blocking the light impinging on the junction between adjacent ones of said facets.

* * * * *